US006542736B1

(12) United States Patent
Parkvall et al.

(10) Patent No.: US 6,542,736 B1
(45) Date of Patent: Apr. 1, 2003

(54) EFFICIENT RADIO LINK ADAPTATION AND BASE STATION SECTOR SELECTION IN A RADIO COMMUNICATION SYSTEM

(75) Inventors: Stefan Parkvall, Stockholm (SE); Erik Dahlman, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/542,984

(22) Filed: Apr. 4, 2000

(51) Int. Cl.⁷ .................................. H04Q 7/00
(52) U.S. Cl. .................. 455/422; 370/465; 370/468
(58) Field of Search ............................. 455/422, 458, 455/62, 63; 370/465, 468

(56) References Cited

U.S. PATENT DOCUMENTS 5,586,170 A    12/1996  Lea
5,857,147 A  *  1/1999  Gardner et al.
6,005,852 A    12/1999  Kokko et al.

FOREIGN PATENT DOCUMENTS

WO    95/12297 A    5/1995
WO    99/23844 A    5/1999

OTHER PUBLICATIONS

TSG–RAN meeting #7, Madrid, Spain, Mar. 13–15, 2000, RP–000126, "Details of high speed downlink packet access", 5pgs.

CDMA/HDR: "A Bandwidth Efficient High Speed Wireless Data Service for Nomadic Users", Paul Bender et al., QUALCOMM, Incorporated, pp. 1–34.

\* cited by examiner

*Primary Examiner*—Thanh Cong Le
*Assistant Examiner*—Huy D Nguyen
(74) *Attorney, Agent, or Firm*—Nixon & Vanderhye, PC (57) ABSTRACT

A mobile terminal sends rapidly changing information relating to the downlink transmission of packet data from a base station sector to the mobile terminal at a higher rate on a fast channel. This rapidly changing information may include, for example, a current data transmission rate and/or a current base station sector identification. Information that changes more slowly, such as the identification of a base station to handle the mobile terminal communication, is communicated to the base station at a lower rate on a slow channel. The information received from the mobile terminal at the higher rate is used by the base station to request a particular sector (and preferably also a sector antenna) to transmit data to the mobile terminal and/or to adjust the current maximum data transmission rate to the mobile terminal. A mobile terminal may also make similar sector/rate requests from plural sectors at the same time as well as from plural sector antennas.

51 Claims, 8 Drawing Sheets

| Max Data Rate | Modulation | Code Rate |
|---|---|---|
| R1 | QPSK | 1/4 |
| R2 | QPSK | 1/2 |
| R3 | 8 PSK | 1/4 |
| R4 | 8 PSK | 1/2 |
| R5 | 16 QAM | 3/8 |
| R6 | 16 QAM | 1/2 |
| R7 | 64 QAM | 1/2 |
| R8 | 64 QAM | 3/4 |

——— High Rate Channel

- Data rate that can be sustained under current channel conditions
- Sector selection based on current signal quality

. . . . Low Rate Channel

- Base State Selection

- - -► Pilot Signal
——► Rate Request & Sector Selection
······► BS Selection
━━► Downlink Channel

EFFICIENT RADIO LINK ADAPTATION AND BASE STATION SECTOR SELECTION IN A RADIO COMMUNICATION SYSTEM

FIELD OF THE INVENTION

The present invention relates to data communications in a radio communications system, and more specifically, to adaptation of a radio link to a mobile terminal based on current radio communication conditions.

BACKGROUND AND SUMMARY OF THE INVENTION

There is an ever increasing convergence of the media industry (including television, video, three dimensional graphics, electronic publishing, and entertainment), the computer industry (including desktop computing, personal computers connected by local area networks, electronic mail, web sites etc.), and the telecommunications industry (both fixed and wireless communications networks). All of these converging industries rely on high-speed data communication capabilities.

High-speed data communication is particularly important for Internet communications. The Internet offers access to an extraordinary variety of information resources across the world. Typically, users make that access from a fixed location, such as their home, business, or school. However, cellular telephones, coupled with an increasing variety of other wireless devices, such as wireless laptops and personal digital assistance (PDAs), are changing otherwise fixed points of access to the Internet to include mobile access by these types of mobile terminals. For the sake of simplicity, the term "mobile terminal" is used to encompass all types of wireless devices.

Mobile radio packet data communications employ a different model than the circuit-switched model used, e.g., for traditional mobile radio voice communications. In circuit-switched communications, each communication link is allocated a dedicated radio channel, i.e., a frequency in an FDMA system, a time slot in a TDMA system, or a code in a CDMA system, for the duration of the communication with a mobile radio. Data to other users is not delivered over that dedicated channel, even if there are periods of silence in the communication when no data is being transmitted. Thus, although circuit-switched channels ensure minimal delay and a guaranteed bit rate, which is important for certain applications like voice communications, they are typically underutilized and also are usually limited in bandwidth. That limited bandwidth, while acceptable for certain applications like voice communications, is not well suited for many high-speed data applications that require considerably more bandwidth.

Packet-based data communications are better suited for high-speed data communications. Data packets are delivered individually using a "best effort," packet-switched network like the Internet. Individual packet routing means that the bandwidth may be used efficiently and that higher bandwidth applications may be accommodated. While wireline data terminals, e.g., personal computers, are capable of utilizing higher, packet-switched network bandwidth, wireless data terminals are at a considerable disadvantage. The bandwidth of the radio interface separating the wireless data terminals from wireline, packet-switched networks like the Internet is limited.

Accordingly, considerable efforts are being made to increase the bandwidth for wireless data communication. That increased bandwidth is particularly important in the radio "down link" direction from the radio network to the mobile terminal. For example, a mobile terminal user might send in the radio "up link" direction, a low bandwidth request, e.g., a command, to download a web page from a site on the Internet. Downloading the web page and other information (especially graphics) from that web site requires considerably more bandwidth.

Another problem confronting data communications over the radio interface is the variable quality of the radio channel or link from base station to mobile terminal (downlink). The radio channel or link quality depends on a number of factors including the distance between the mobile terminal and a transmitting base station in the radio network, interference from other transmitting base stations and mobile terminals, path loss, shadowing, short term multi-path fading, etc. If the channel quality is good, the base station may modify the signal transmission parameters to increase the data transmission rate from the base station to the mobile terminal. On the other hand, if the channel quality is bad, the signal transmission parameters may need to be adjusted to lower the data transmission rate to ensure that the signal is reliably received.

The process of modifying one or more signal transmission parameters to compensate for channel quality variations is sometimes referred to as "link adaptation," where "link" refers to the radio link between a base station and a mobile terminal. Link adaptation may be accomplished by changing the transmit power of the base station, e.g., increasing the transmit power level for data transmitted to mobile terminals with a bad channel quality. Link adaptation may also be accomplished by changing the type of modulation and amount of channel coding applied to the data to be transmitted by the base station. Moreover, link adaptation may also be performed in the uplink by the mobile terminal.

The present invention is concerned with the latter type of link adaptation because in wide band code division multiple access (WCDMA) communication system, increasing the base station transmit power for an individual subscriber communication adversely impacts other mobile subscriber communications and ultimately limits the overall system capacity. In contrast, changing the modulation and/or coding format to match the current channel quality, without increasing the transmit power, does not adversely impact other mobile subscriber communications or the overall system capacity. For example, mobile terminals close to the base station (presumably experiencing a high channel quality) may be assigned a higher order modulation that provides higher bit rates. A lower order modulation offering a lower bit rate may be employed for communications with mobile terminals farther away from the base station (presumably experiencing lower channel quality). Similarly, when the channel quality is relatively good, higher code rates (i.e., less redundancy) may be employed. Lower code rates (more redundancy) are employed for lower channel quality.

The underlying assumption is that the maximum data rate reasonably supported with each mobile terminal, (i.e., the maximum data rate under the current radio channel conditions to meet a certain performance standard such as a maximum bit error rate), depends on the channel quality experienced by the mobile terminal.

Each base station may be divided into multiple sectors, where each sector serves a particular portion of the geographical area surrounding the base station. For example, each sector of a three sector base station serves approximately one third of the total geographical area surrounding that base station. The mobile terminal estimates the channel quality by measuring the signal quality of pilot signals or other broadcast signals transmitted by nearby "candidate" base station sectors, where some of the sectors may be associated with different base stations. Based on the estimated channel qualities, the mobile terminal determines a maximum data rate at which the mobile terminal can receive data for each base station sector and selects the sector with the highest data rate. The mobile terminal sends a rate/sector request message to one or more base stations in the radio network including information about the current estimated maximum supportable transmission rate as well as the currently requested sector to make the downlink transmission to the mobile terminal. That message also identifies a currently requested base station.

In order to track the rapidly changing conditions of the radio channel, the channel quality measurements are performed at a high rate and the corresponding rate/sector request messages are sent at a high rate in order to track those rapid changes. When a base station receives these rate/sector request messages from several mobile terminals, the base station chooses which sector will handle the data transmission to the mobile terminal based on some scheduling or other decision making algorithm. The base station may, in principle, use any transmission rate below or equal to the rate message from the mobile terminal. However, the following description adopts a decision-making algorithm that results in the highest system throughput. The entire transmission power for high-rate, data packet communications in one sector is assigned to the mobile terminal communication supporting the highest data rate in that sector. The data rate of the other mobile terminal communications in the sector equal is set to zero.

Like the channel quality and associated maximum data transmission rate, the sector requested by the mobile terminal to currently handle the data transmission with the mobile terminal may also vary rapidly. The data packet transmission queue which stores the data packets to be transmitted to the mobile terminal is commonly accessible at a single base station by all sectors of that base station. Accordingly, the data packets from that queue can be quickly routed from one sector to another sector associated with the same base station. On the other hand, the base station currently handling the mobile data transmission cannot be switched as rapidly because a radio network control node is involved in "handing over" the mobile data communication (including the data packets in the transmission queue) from the current base station to the new base station.

It is an inefficient use of the limited radio bandwidth to transmit slowly changing information, e.g., a request for a new base station to handle a communication with a mobile terminal, along with rapidly changing information, e.g., requested maximum transmission rate and/or base station sector.

It is also inefficient for a mobile terminal to only request a single sector to transmit data to the mobile terminal at one time. If only one maximum transmission rate/sector request message is transmitted per mobile terminal, and two or more mobile terminals transmit such messages to the same base station requesting the same sector, the base station will choose only one mobile terminal, e.g., the one requesting the highest data rate. Consequently, the transmission of data to the other mobile terminal is delayed.

It is an object of the present invention to provide a link adaptation and sector selection communications scheme that overcomes the inefficiencies noted above.

In accordance with present invention, a mobile terminal sends rapidly changing information relating to the downlink transmission of packet data to a mobile terminal on a fast radio channel. A fast channel provides only a short delay from the time a channel quality measurement is made to the time action is taken in the base station. Moreover, the mobile terminal requests to the base station(s) and the base station action occur frequently in order to track fast channel changes of the channel. This rapidly changing information may include, for example, a current data transmission rate and/or a current base station sector identification. Information that changes more slowly, such as the identification of a base station to handle the mobile terminal communication, is communicated to the base station on a slower radio channel.

At a relatively low reporting rate or when the mobile terminal detects a change in condition that affects base station selection, the mobile terminal requests a new base station to handle the mobile terminal data transmission. The mobile terminal determines the channel quality from candidate sectors associated with the current base station and a corresponding maximum transmission rate for each such sector. A sector with a suitable channel quality/transmission rate is identified by the mobile terminal. Rapidly changing information such as the sector identification and/or maximum data rate information is transmitted to the base station at a relatively high reporting rate. In this way, limited radio bandwidth is not wasted by repeatedly sending information (like the current base station selection) that likely has not changed. On the other hand, rapidly changing information, such as the current channel quality which affects the rate data can be reliably communicated to the mobile terminal, is transmitted at a high frequency so that the base station can rapidly adapt one or more transmission parameters.

The base station receives the current base station identification from the mobile terminal at the lower reporting rate. If there is a change in base station, base station handover procedures may then be initiated. The information received from the mobile terminal at the higher reporting rate is used by the base station to select the particular sector to transmit data to the mobile terminal and/or adjust the current maximum data transmission rate. Since the base station includes a common storage queue of data packets to be sent to the mobile terminal, the switching of sectors associated with the same base station is rapidly executed. The data transmission rate information received from the mobile terminal is used by the selected base station sector to adapt the down link data transmission rate. For example, the amount of channel coding is adapted to accommodate the requested data transmission rate. The type of data modulation may also be adapted to accommodate the requested data transmission rate. As a result of such adaptation, the amount of data transmitted per unit time is increased or decreased in accordance with the current channel conditions.

A mobile terminal preferably makes similar sector/rate requests from plural sectors at the same time. For example, a mobile terminal may identify a first and second sector at the selected base station as potential candidates for transmitting data to the mobile terminal. The mobile terminal determines a first sector data rate and a second sector data rate, and transmits those rates to the base station at the higher frequency. In one non-limiting, example implementation, the first and second sector data rate information can be sent over separate sub-channels which can be either code- or time-multiplexed. When the base station receives the sub-channel request information from the mobile terminal for the first and second sectors, it has the option of selecting a sector suitable for sending the data to the mobile terminal. Although this decision may be determined based solely on the maximum transmission rate information associated with the first and second sectors, (e.g., the highest rate sector is selected), the present invention also permits the base station to make the decision taking into account requests from other mobile terminals. As a result, the base station can accommodate down link transmissions to both mobile terminals using two different sectors. This results in a higher system throughput compared with only one (corresponding to the highest data rate) data transmission being made to one of the mobile terminals.

Along with plural sector/rate requests from each mobile terminal, the present invention utilizes plural antennas at each base station sector to provide additional capacity and flexibility in down link data transmissions. A mobile terminal determines a channel quality or maximum supportable data rate for each of the plural antennas in each candidate sector. The mobile terminal transmits one (and preferably more) messages with a maximum data rate for a selected sector and sector antenna at the higher frequency to the base station. Based on the information received from the mobile terminal, and possibly also from other mobile terminals, one of the plural antennas at a selected sector is used to transmit data at the corresponding rate to the mobile terminal. In effect, the plural sector antennas provide a form of transmit diversity as a "overlaid" sectors.

BRIEF DESCRIPTION OF THE DRAWINGS

The foregoing and other objects, features, and advantages of the invention will be apparent from the following description of preferred, non-limiting example embodiments, as well as illustrated in the accompanying drawings. The drawings are not necessarily to scale, emphasis instead being placed upon illustrating the principles of the invention.

DETAILED DESCRIPTION OF THE INVENTION

In the following description, for purposes of explanation and not limitation, specific details are set forth, such as particular embodiments, procedures, techniques, etc., in order to provide a thorough understanding of the present invention. However, it will be apparent to one skilled in the art that the present invention may be practiced in other embodiments that depart from these specific details. In other instances, detailed descriptions of well-known methods, interfaces, devices and signaling techniques are omitted so as not to obscure the description of the present invention with unnecessary detail. Individual functional blocks and components are shown in some of the figures. Those skilled in the art will appreciate that the function may be implemented using individual hardware circuits, using software functioning in conjunction with suitably programmed digital microprocessor or general purpose computer, using an application-specific integrated circuit (ASIC), and/or using one or more digital signal processors (DSPs).

Figure 1:
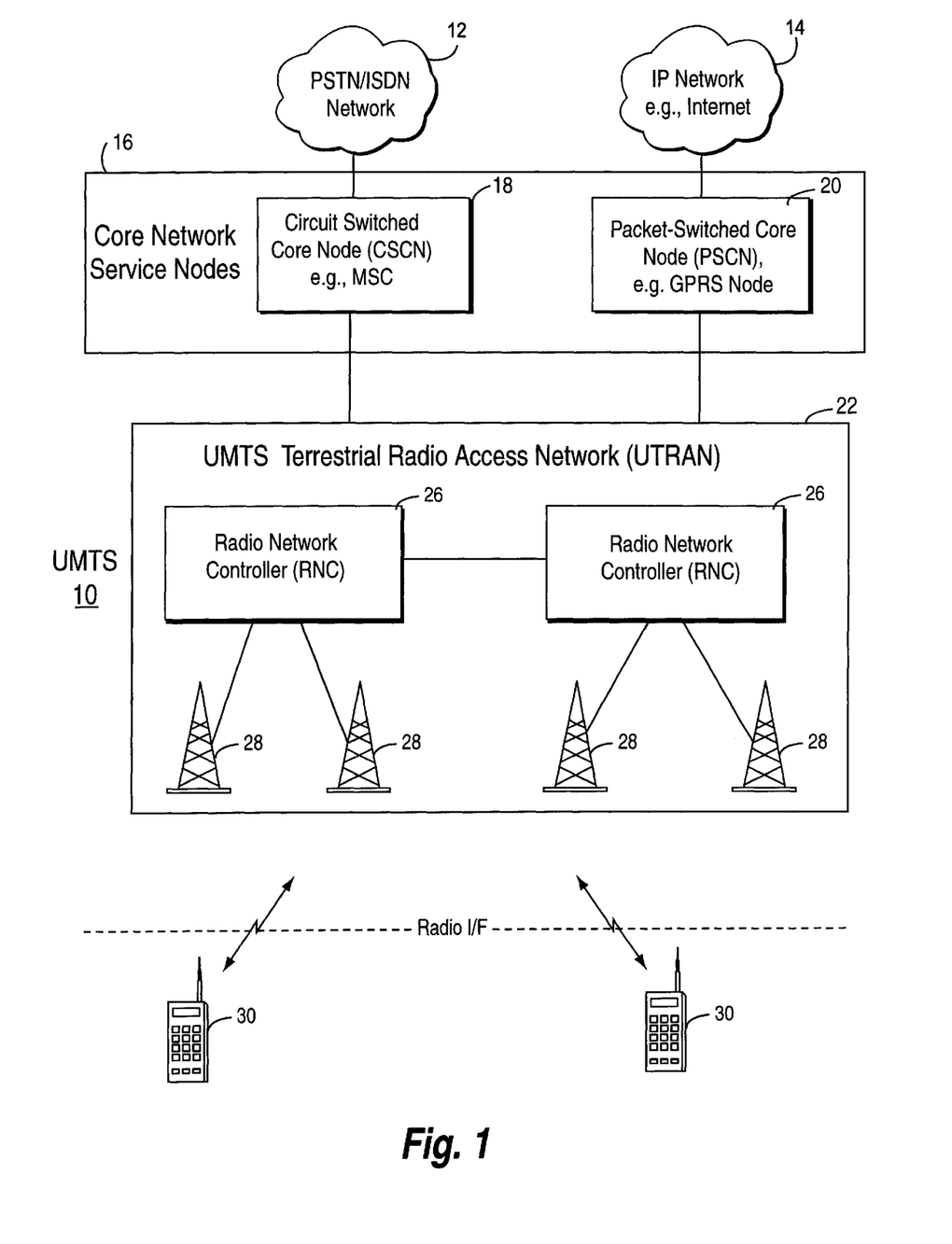
FIG. 1 is a non-limiting example of a mobile communications system in which the present invention may be employed.

One example, non-limiting environment in which the present invention may be employed is in the context of a Universal Mobile Telecommunication System (UMTS) 10 shown in FIG. 1. A representative, circuit-switched core network, shown as a cloud 12, may be for example the Public Switched Telephone Network (PSTN) or the Integrated Services Digital Network (ISDN). A representative, packet-switched core network, shown as a cloud 14, may be for example an IP network like the Internet. Both core networks are coupled to corresponding core network service nodes 16. The PSTN/ISDN circuit-switched network 12 is connected to a circuit-switched service node shown as a Mobile Switching Center (MSC) 18 that provides circuit-switched services. The packet-switched network 14 is connected to a General Packet Radio Service (GPRS) node 20 tailored to provide packet-switched type services.

Each of the core network service nodes 18 and 20 connects to a UMTS Terrestrial Radio Access Network (UTRAN) 24 that includes one or more Radio Network Controllers (RNCs) 26. Each RNC is connected to a plurality of Base Stations (BS) 28 and to any other RNCs in the UTRAN 22. Radio communications between the base stations 28 and Mobile Terminals (MT) 30 are by way of a radio interface. Radio access is based on Wide-band CDMA (W-CDMA) with individual radio channels distinguished using orthogonal spreading codes. Wide-band CDMA provides wide radio bandwidth for multiple media services including packet data applications that have high data rate/bandwidth requirements.

Figure 2:
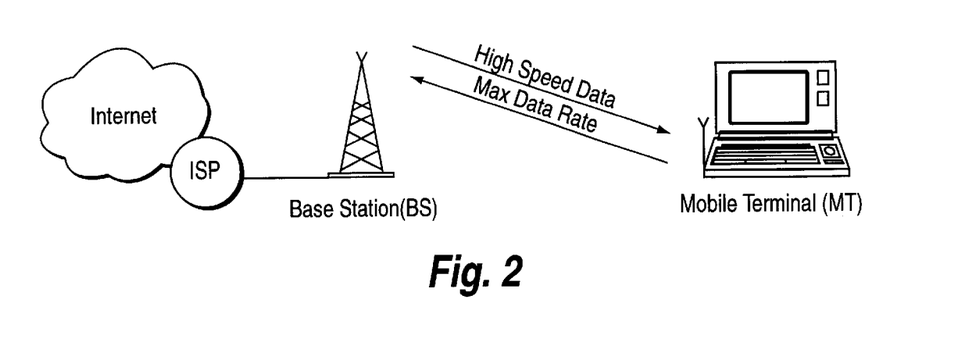
FIG. 2 is a diagram illustrating a mobile terminal connection with the Internet.

One scenario in which high speed data may need to be transmitted from the UTRAN over the radio interface to a mobile terminal is when the mobile terminal requests information from a computer attached to the Internet, e.g., a web site. FIG. 2 illustrates this scenario. The mobile terminal communicates over the radio interface with the Internet by way of a base station and an Internet Service Provider (ISP). As described earlier, the maximum transmission rate for transmitting data to meet a prescribed performance, (e.g., a particular bit error rate), from the base station to the mobile terminal depends on the current radio channel quality between the base station and the mobile terminal. One measure of the channel quality is signal-to-noise ratio ($E_b/N_o$) or signal-to-interference ratio (C/I). The mobile terminal determines the maximum data rate in view of that channel quality for a given level of error performance, using for example a pre-configured look up table, and provides that data rate information back to the base station.

Figure 3:
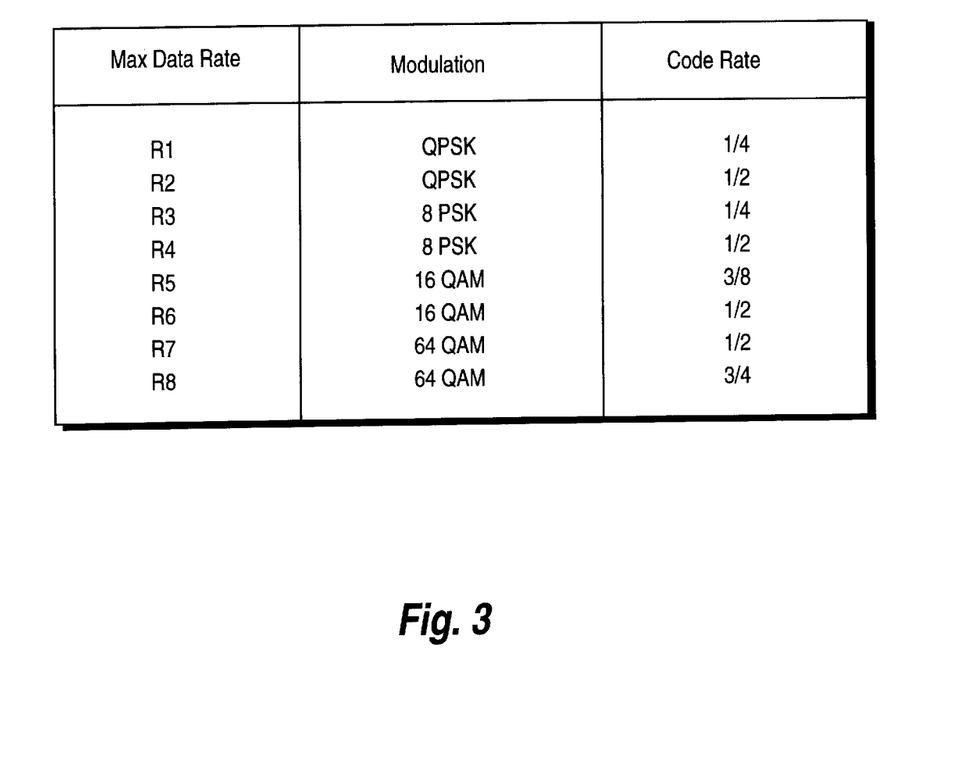
FIG. 3 is a table relating different modulation types and channel coding rates to different channel quality levels/ maximum data rates determined by the mobile terminals.

The maximum data rate request can then be mapped by the base station, (e.g., using a lookup table), to a corresponding modulation type and/or code rate suited to deliver this maximum data rate for the given level of performance. Such a lookup table is shown in FIG. 3. There are eight example levels of mobile terminal detected channel quality or maximum data rate from lowest quality to highest quality. A modulation technique, such as Quadrature Phase Shift Keying (QPSK), has a lower effective data rate than other types of modulation, such as 64 Quadrature Amplitude Modulation (QAM). 64-QAM delivers more data per transmitted symbol. The code rate corresponds to the amount of redundancy built into the transmitted data and can be changed depending on the channel quality. A code rate of ¼ delivers one data bit per four bits transmitted. A code rate of ¾ delivers three data bits per four bits transmitted.

In the example shown in FIG. 3, the code rates increase with increasing channel quality/maximum data rate for each type of modulation scheme. Thus, at the lowest level 1, only one information bit is effectively transmitted for every four coded bits, corresponding to two QPSK symbols. Contrast this with the highest channel quality in which 64-QAM and rate ¾ coding is used, resulting in 4.5 information bits per transmitted 64-QAM symbol. Thus, the modulation and code rate at the highest level 8 results in a much higher data throughput per unit time than throughput achieved at the lowest level 1.

Figure 4:
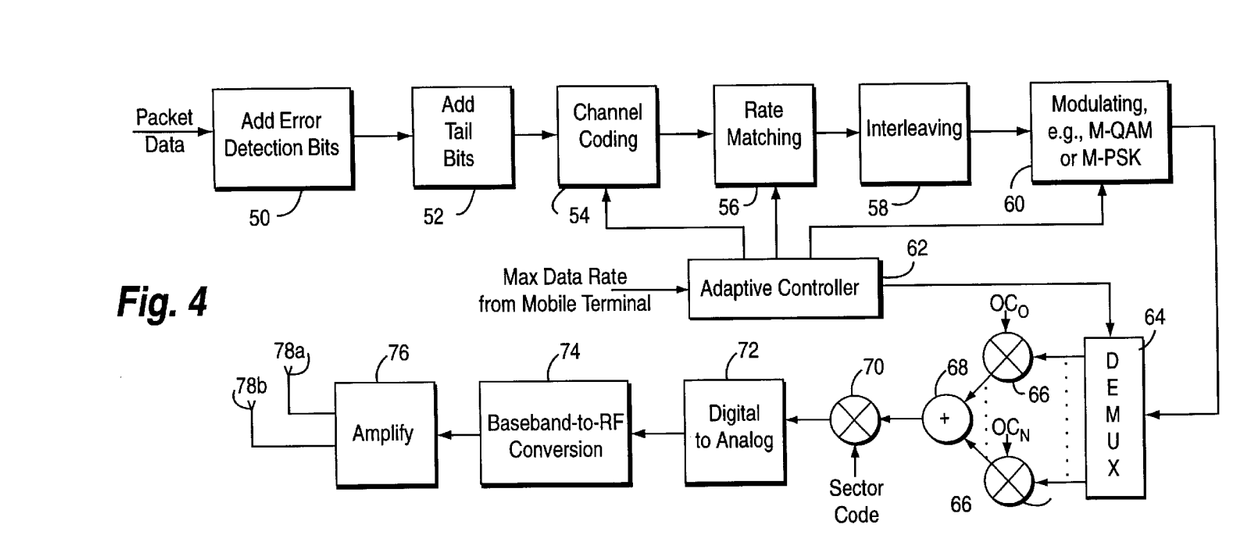
FIG. 4 illustrates in function block form example signal processing functions performed on packet data to be transmitted from a base station to a mobile terminal when adapting certain transmission link parameters.

FIG. 4 illustrates in function block format one non-limiting, example of a base station configured to perform link adaptation based on the radio channel quality detected by the mobile terminal. Using the detected channel quality, the mobile terminal determines a maximum data rate and provides it to an adaptive controller 62. The adaptive controller 62 controls one or more transmission parameters affecting how the data is transmitted over the radio link to the mobile terminal. Packet data intended for the mobile terminal is stored in a transmission queue or buffer in the base station and is provided to a block 50 that appends error detection bits. Error detection bits, such as checksum bits, are used to detect errors in received blocks of data. Tail bits are added at block 52 to ensure that the channel coding 54 ends at a well-determined state to simplify the channel decoding at the receiver.

The channel coder 54 adds redundancy to the actual data bits. The amount of added redundancy is controlled by the adaptive controller 62 in accordance with the maximum data rate request received from the mobile terminal. As described above, more redundancy is required on a lower quality radio channel than for a higher quality radio channel. A rate ¼ coder outputs four times as many coded bits as received input bits. A rate ½ coder outputs twice as many coded bits as received input bits. Thus, a rate ¼ code is more suitable for a lower quality channel than a rate ½ code because it adds more redundancy, and therefore, the receiver is more likely to decode the information data bits correctly.

The rate matching block 56 removes a few coded bits. For example, if a rate 0.55 code is desired, a code rate ½ could be used, and a few coded bits removed (punctured). The rate matching function 56 is useful for fine tuning code rates. Interleaver 58 randomly permutes the coded bits to improve the code performance in the presence of burst errors on the radio channel. A reverse inter-leaving process (de-interleaving) is performed at the receiver before decoding. The interleaved data is provided to a modulator 60, which can be for example an adaptive modulator such as an M-QAM modulator, controlled by the adaptive controller 62. The modulator 60 maps the coded bits into modulation symbols corresponding essentially to complex numbers. A variety of different modulation techniques can be used, and those shown in FIG. 3 are merely non-limiting examples.

The "M" in M-QAM denotes the number of alternatives for each modulation symbol. For example, 4-QAM, 16-QAM and 64-QAM can transmit 2, 4 and 6 coded bits per modulation symbol respectively. In this example, 64-QAM can transmit the largest number of bits per symbol, but 64-QAM is the most susceptible to corruption by noise and interference. However, 64-QAM is a good modulation scheme on a high quality radio channel because it achieves a higher data throughput. On a low quality channel however, it may be more advisable to use 4-QAM.

The de-multiplexer 64 de-multiplexes the modulated data stream into several lower bit rate data streams, e.g., N streams. In an example where N=2, input bits 1, 3, 5, 7, . . . would appear on the first de-multiplexer output, and bits 2, 4, 6, 8, . . . would appear on the second de-multiplexer output. Each output is subsequently spread by a unique code, e.g., an orthogonal code such as a Walsh code, and summed in summer 68. Spreading the lower bit rate streams results in a signal with a wider bandwidth with each information data bit being represented by multiple "chips."

The number of parallel data streams output by the de-multiplexer may also be controlled by the adaptive controller 62 depending on the channel conditions. For a low quality radio channel, it may be better to use only one channel with all the available transmission power. On the other hand, for a higher quality channel, several sub-channels corresponding to parallel lower bit rate data streams may be used. Furthermore, a higher quality radio channel may also support a lower spreading factor, (i.e., fewer chips are used to spread each data bit), which at a constant chip rate results in a higher bit rate.

The output from summer 68 is multiplied by a sector-specific scrambling sequence, converted into analog format in a digital to analog converter 72, up-converted to the desired radio frequency in the baseband-to-RF conversion block 74, amplified in block 76, and transmitted over one or more sector antennas. Two sector antennas 78a and 78b are shown in FIG. 4.

Figure 5:
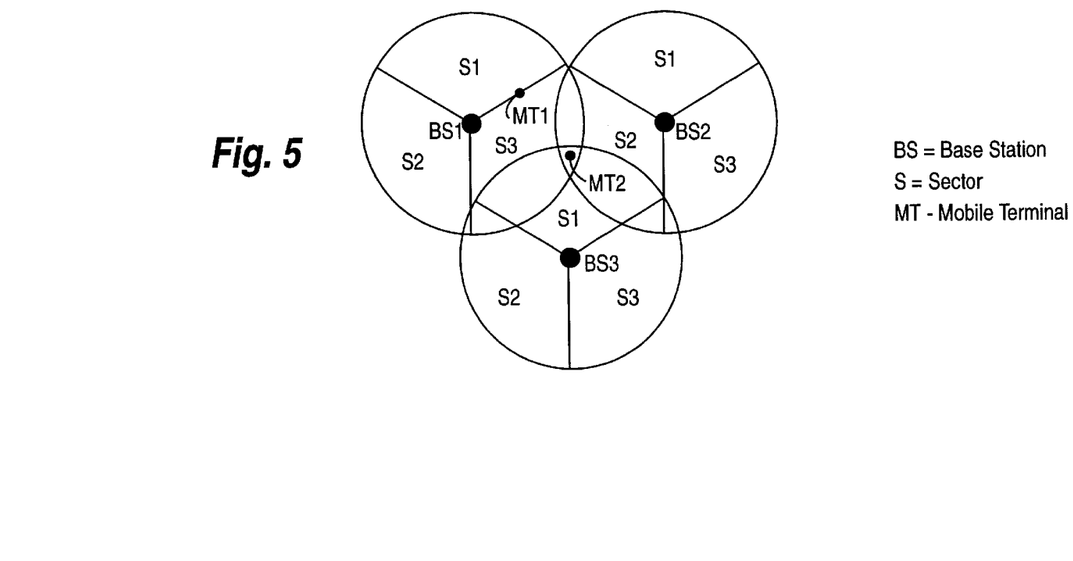
FIG. 5 is a diagram illustrating an example of three adjacent, sectored base stations.

Reference is now made to FIG. 5 which shows three base stations BS1, BS2, and BS3 each having three sectors S1, S2, and S3. A first mobile terminal MT1 is located on the border between sectors S1 and S3 of base station BS1. A second mobile terminal MT2 is located in a region where all three base station coverage areas overlap. Both mobile terminals monitor the signal quality of the pilot channel transmissions from nearby base station sectors. The mobile terminal maintains a "candidate set" listing those sectors from which acceptable quality pilot channel signals are received. The channel qualities detected for those sectors in the candidate set are monitored at a high rate.

As described earlier, each mobile terminal determines the quality of the pilot channel signals received from sectors in its candidate set. The channel quality values are each mapped to a value representing a maximum data rate for a given level of error performance. The mobile terminal requests the base station sector in its candidate set based on some criteria, e.g., the sector with the highest maximum data rate, and sends the sector/rate information to that sector. Only the requested sector transmits data to the mobile terminal at any given time.

In order to adapt to rapidly changing radio channel conditions, the maximum rate and sector request information is transmitted by the mobile terminal at a relatively high rate, e.g., about once every millisecond. As the mobile terminal moves or radio channel conditions change, it may be necessary for the mobile terminal to select a new maximum data rate, sector, or base station. Indeed, the mobile terminal MT2 shown in FIG. 5 may well need to change the rate, sector and base station. However, the majority of mobile terminals will likely only be changing base stations relatively infrequently, and certainly at a lower rate than sector or maximum data rate changes.

Figure 6:
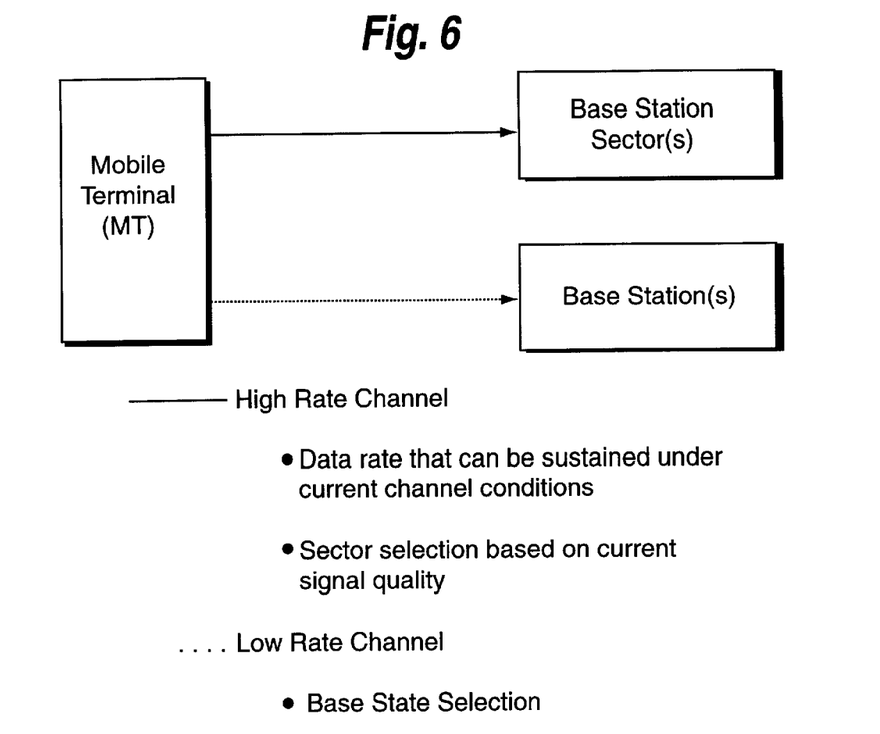
FIG. 6 is a diagram illustrating one aspect of the invention.

It is an inefficient use of limited radio channel resources to transmit slowly changing information from the mobile terminal to the base station at the same rate as rapidly changing information. As shown in FIG. 6, the present invention employs a fast/high rate channel to transmit rapidly changing information to the base station and a slow, low rate channel to transmit slowly changing information to the base station.

Information that should transmitted over the fast channel includes the current sector selected by the mobile terminal and the maximum data rate associated with the current down link transmission from that sector. Consider the mobile terminal MT1 in FIG. 5. Assume that MT1 can receive data from sector S1 at rate R11. MT1 can also receive data from sector S3 at rate R13. At one point in time, the maximum transmission rate R11 may exceed R13, and therefore, MT1 selects sector S1. Given that MT1 is located at the border between sectors S1 and S3, the maximum transmission rates may change quite rapidly, and MT1 may obtain a higher maximum transmission rate from sector S3. Because base station BS1 has a common data queue holding packets for transmission to MT1, transmission of that data to MT1 can be switched rapidly from sector S1 to sector S3. Thus, it is advisable to provide sector request information from mobile terminals quite frequently along with maximum transmission rate information which may change rapidly independent of sector changes.

On the other hand, a mobile terminal's choice of base station will likely vary at a much slower rate and therefore warrants only a lower rate communication of base station selection information from the mobile terminal to the base stations. Moreover, even in circumstances, (such as may exist for the mobile terminal MT2 in FIG. 5), where base station selection may vary more frequently than normal, switching between base stations (e.g., 100–300 msec) takes considerably more time than switching between sectors, (e.g., 1–2 msec). The data packets to be transmitted to the mobile terminal stored at the current base station must be transferred to the newly selected base station sector. This data packet transfer takes considerable time, and therefore, does not justify high rate, base station request reports from the mobile terminal.

Another aspect of the present invention is that mobile terminals are permitted to make multiple maximum transmission rate and/or sector requests to several sectors at the same base station. If only one rate request is permitted per mobile terminal, the overall system throughput is decreased. Consider the example in FIG. 5. Both mobile terminals MT1 and MT2 can receive data from sector S3. MT1 can receive from sector S3 at rate R13. MT2 can receive from sector S3 at rate R23. Suppose that MT2 currently has the best radio channel from sector S3, i.e., R23>R13. Furthermore, suppose that MT1 can also receive from sector S1 at a rate R11 because it is at the border between S1 and S3. Assume also that R13 is greater than R11. If only one rate request is transmitted per mobile terminal, MT1 transmits rate R13, and MT2 transmits rate R23 to base station BS1. Thus, both mobile terminals have selected sector S3. MT2 would "win the competition" because R23 is greater than R13. Therefore, MT2 receives its data on the downlink, while MT1 would not receive any data at all at this moment.

With the present invention, two or more maximum transmission rate requests may be transmitted from each mobile terminal. In this simple example, MT2 transmits a single rate request R23, and MT1 transmits two rate requests R11 and R13. MT2 indicates its preference for sector S3 along with rate R23. MT1 requests data from sector S3 at rate R13, since it has a high quality radio channel. As a second choice, MT1 requests data from sector S1 at a lower rate R11 because the radio channel conditions between MT1 and sector S1, although acceptable, are currently not as good as those between MT1 and S3. The base station BS1 schedules the downlink transmission to MT2 on sector S3 at rate R23, and the downlink transmission to MT2 from sector S1 at rate R11. In this way, both mobile terminals MT1 and MT2 receive data at acceptable transmission rates, i.e., R11 and R13, while achieving a higher overall system throughput since both downlink transmissions are accommodated.

Figure 7:
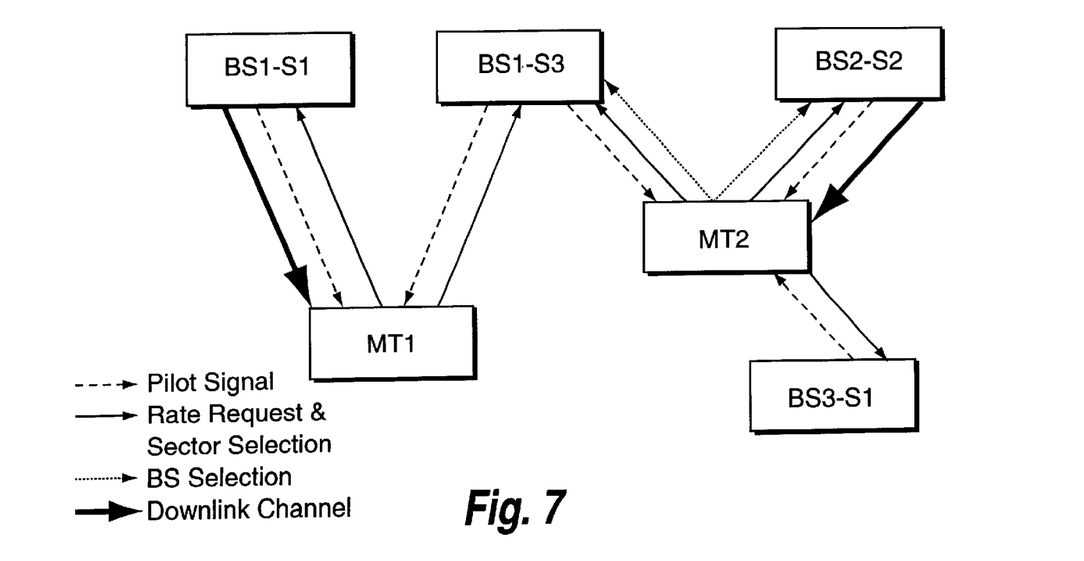
FIG. 7 is a diagram illustrating another aspect of the invention.

FIG. 7 illustrates an example where two mobile terminals MT1 and MT2 monitor pilot signals from plural base station sectors to determine channel quality and corresponding maximum rate for each sector. Both of the mobile terminals make plural rate requests and/or sector requests. MT2 also makes a base station selection. The rate and sector requests are made over a high rate channel, and the base station request is made over a slower, low rate channel. In this example, a radio network controller coupled to base stations BS1 and BS2 determines that MT1 will receive its downlink transmission from sector S1 from base station BS1, and MT2 will receive its downlink transmission from sector S2 from base station BS2.

Figure 8:
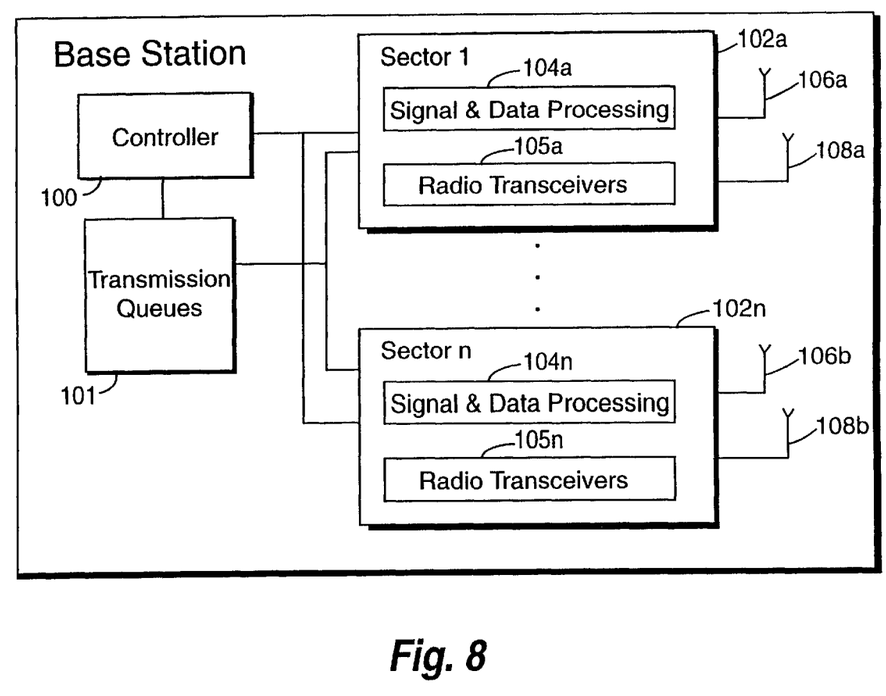
FIGS. 8 and 9 are function block diagrams illustrating in simplified form a base station and a mobile terminal that may be used in implementing the present invention.

FIG. 8 illustrates a base station in simplified function block format that may be used to implement the present invention. A base station controller 100 is coupled to multiple base station sectors 1-n identified as 102a–102n. Each sector includes signal and data processing hardware and software 104 as well as radio transceivers 105 coupled to one or more antennas. In this example, two antennas are shown for each sector 106 and 108. Each of the sector antennas may be treated as "overlaid" sectors. The controller 100 is coupled to data transmission queues 101. Each data transmission queue stores packets to be transmitted for an active connection with a mobile terminal. As described above, depending upon sector selections by a mobile terminal, the controller 100 quickly switches the transmission queue output to the selected sector.

Figure 9:
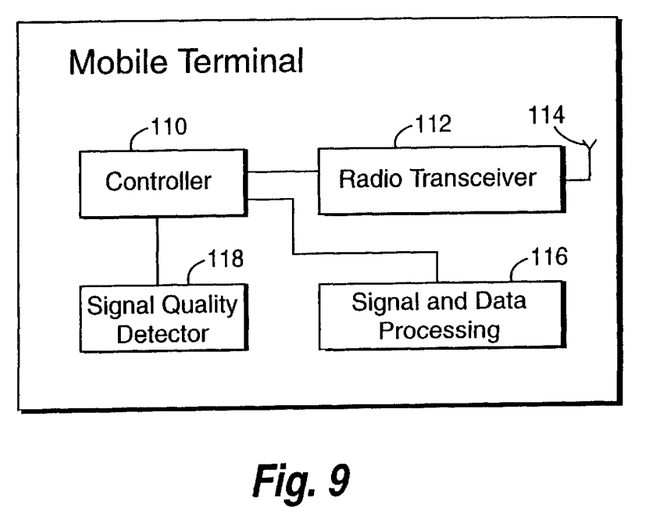

A simplified function block diagram of a mobile terminal that may be used to implement the present invention is shown in FIG. 9. A controller 110 is coupled to a radio transceiver 112, signal and data processing circuitry 116, and a signal quality detector 118. The radio transceiver 112 is coupled to an antenna 114. In a non-limiting, example embodiment, both the base station and the mobile terminal employ a spread spectrum radio access communication technique. The mobile terminal uses the signal quality detector 118 to detect the signal quality (e.g., signal-to-noise ratio) for each received sector pilot signal in its candidate list. The controller 110 maps each signal quality to a particular modulation and/or code rate using for example a lookup table like that shown in FIG. 3. Alternatively, the signal quality could be forwarded to the base station and the corresponding modulation and code rate mappings could be made there.

Figure 10:
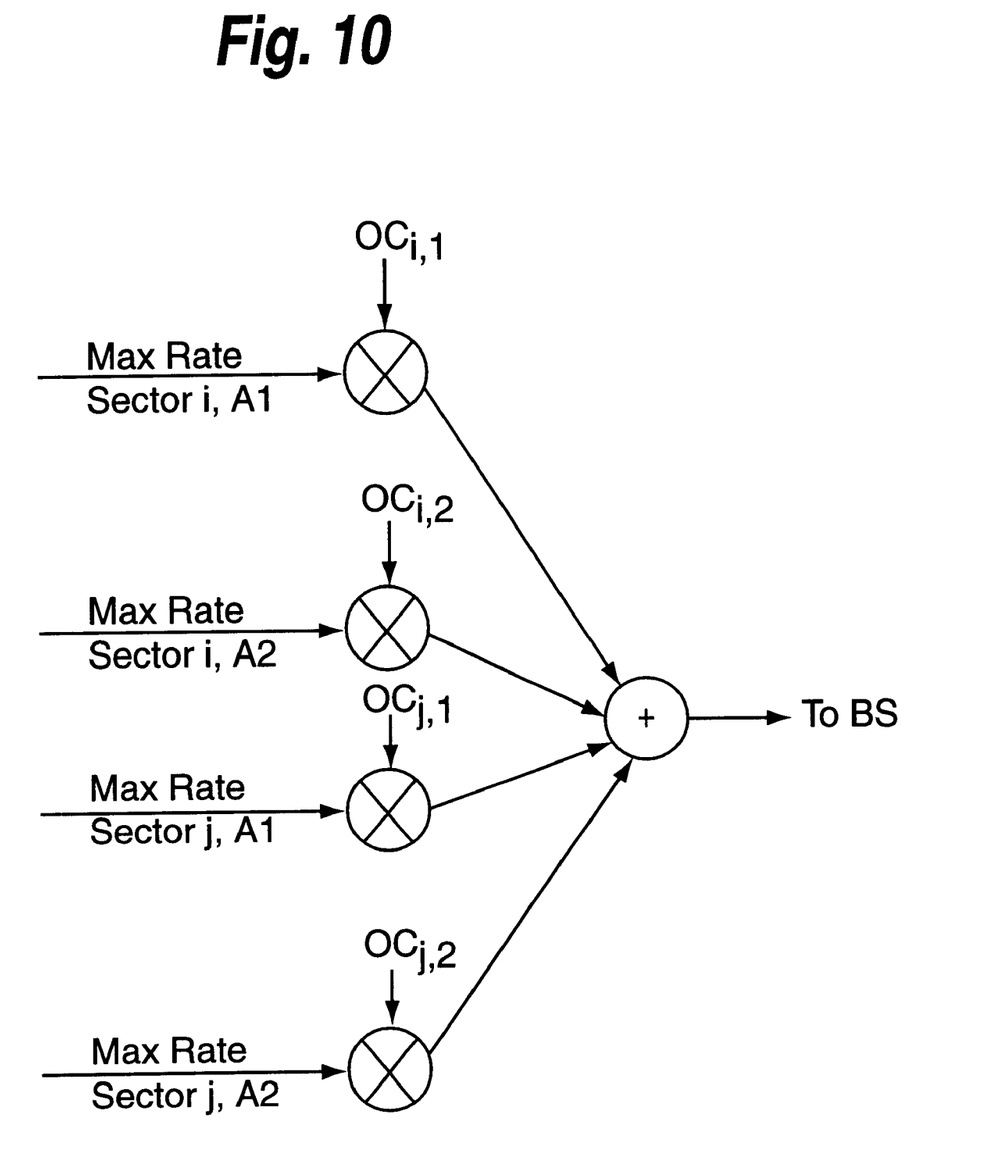
FIG. 10 illustrates an example, non-limiting technique for transmitting multiple rate/sector/antenna requests from a mobile terminal to a sectored base station.

FIG. 10 illustrates a non-limiting, example way for a mobile terminal to transmit plural, high rate rate/sector/ antenna messages to multiple base station sectors. Each high rate message, including sector and sector antenna combination along with a corresponding maximum transmission rate, is assigned a unique orthogonal sub-channel, e.g., an orthogonal code (OC) like a Walsh code or a unique time position. FIG. 10 shows a code-multiplexed channel being sent to the base station. Time-multiplexed channels could also be used. The sub-channels are then summed and transmitted to the base station. The base station decodes the received composite signal using the unique orthogonal code or time position.

Figure 11:
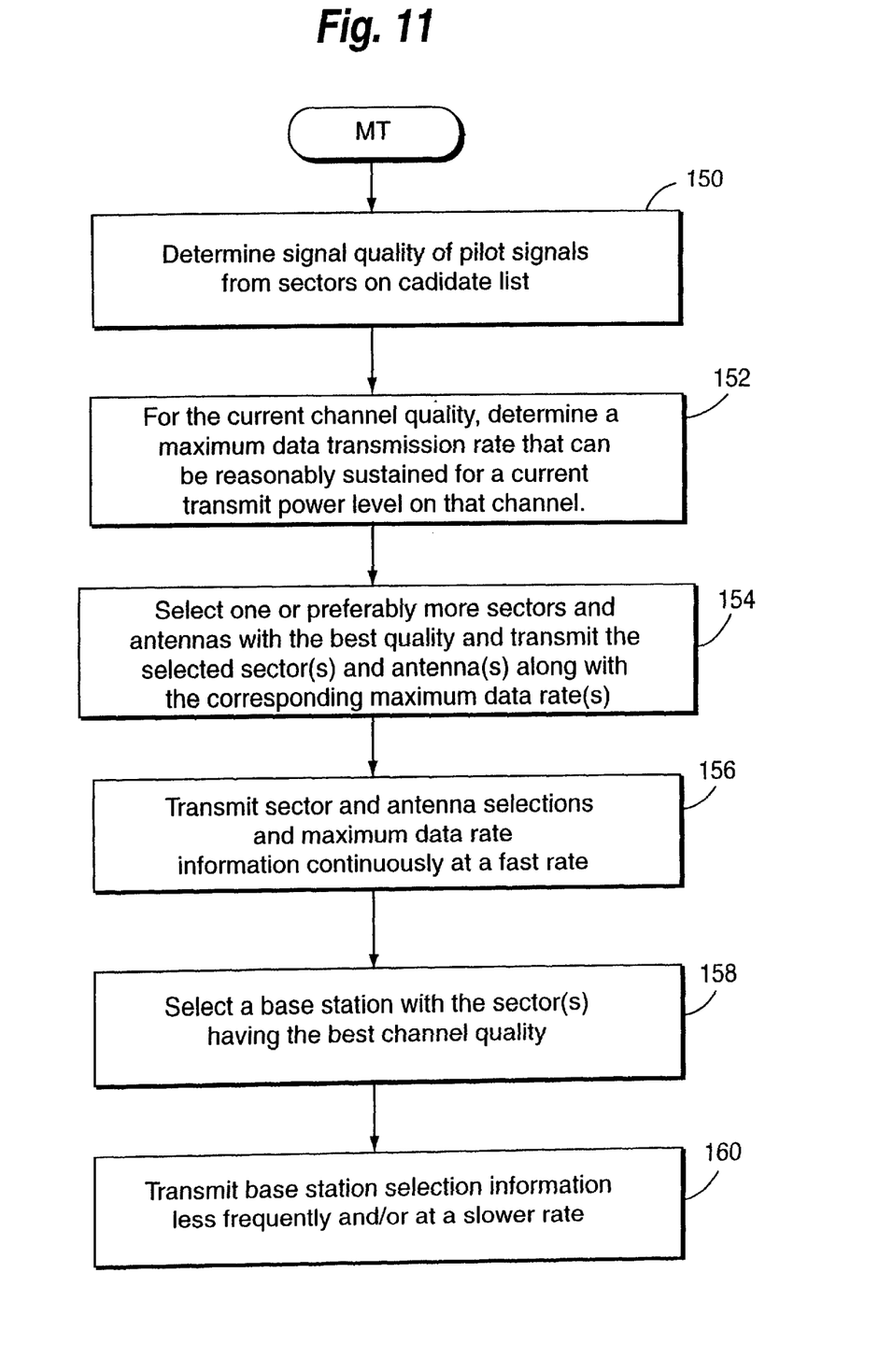
FIG. 11 illustrates procedures shown in flowchart form that may be followed by a mobile terminal in implementing certain aspects of the invention.

FIG. 11 illustrates procedures implemented by a mobile terminal in accordance with one non-limiting, example of the present invention. Initially, the mobile terminal determines the signal quality of pilot channel signals from sectors on its candidate list (block 150). For the detected signal from each candidate sector, the mobile terminal determines a maximum data transmission rate that can be reasonably sustained for a given level of error performance and a given transmit power level (block 152). The mobile terminal then selects one or preferably plural sectors with the best signal quality values and transmits the selected sector and corresponding maximum transmission rate information to the base stations (block 154). These transmissions occur with high rate over a fast channel as described above and illustrated in FIG. 6.

In addition, the mobile terminal may also detect the current channel quality of pilot signals transmitted from each of plural antennas at each base station sector on the candidate list. From the mobile terminal point-of-view, the sector antennas may be viewed as overlapping sectors. For example, if a base station includes three sectors, and each sector has two antennas, the mobile terminal may view the base station as having six sectors in three geographical areas. Each of these six sector antennas is provided its own identifier, e.g., a scrambling code, transmitted in its downlink pilot signal. The mobile terminal determines a maximum data transmission rate that can be reasonably sustained for each of the antennas and selects the best sector antennas. The selected sector and antenna identifiers are transmitted to the base station along with their corresponding maximum data rates.

The mobile terminal also monitors which base station is associated with the sector(s) or antennas having the best channel qualities (block 156). The mobile terminal selects the base station with the best quality sectors and transmits the base station selection at a lower rate over a slower channel (block 160) in order to more efficiently use the bandwidth as described above and illustrated in FIG. 6.

Figure 12:
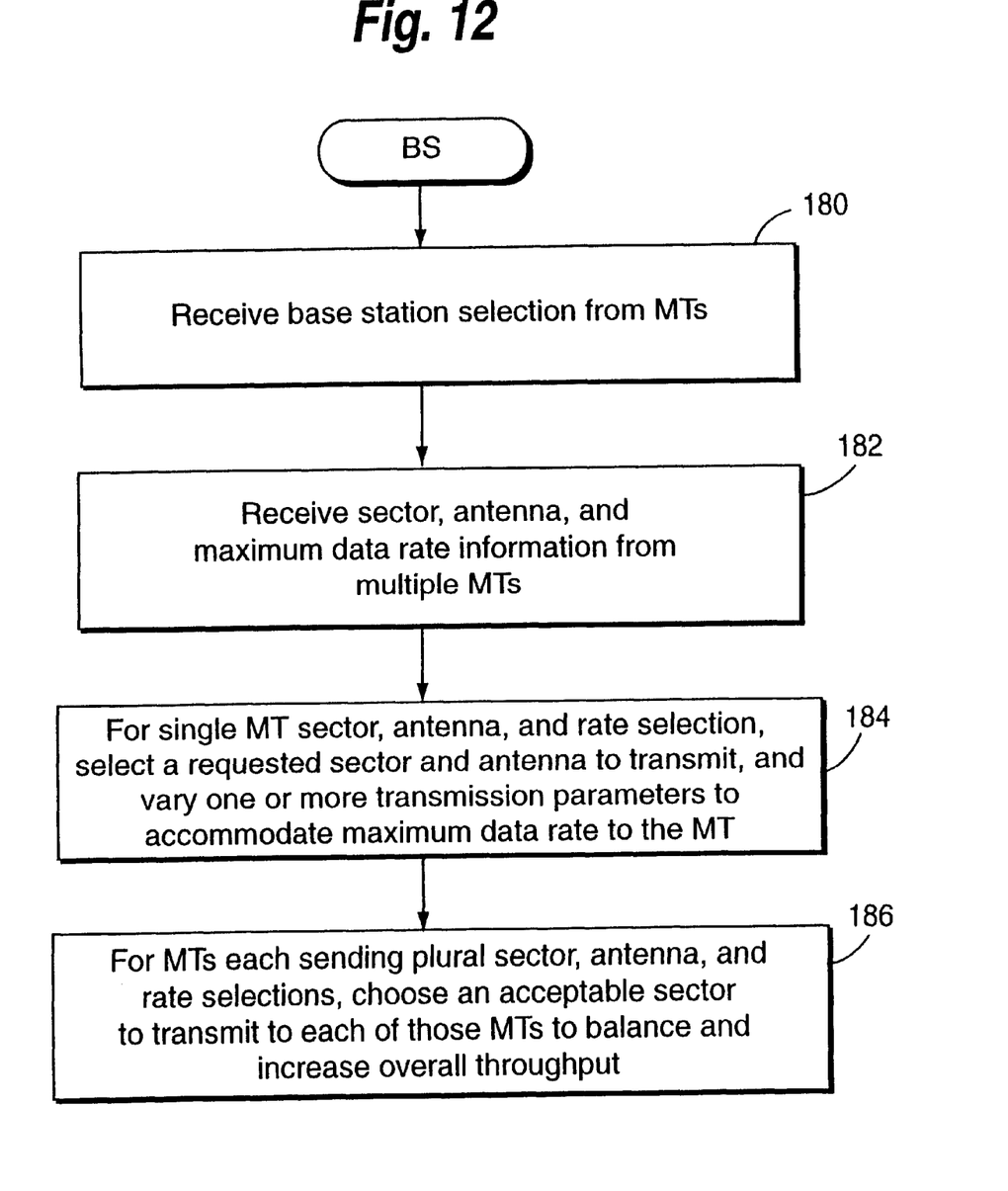
FIG. 12 illustrates procedures shown in flowchart form that may be followed by a base station in implementing certain aspects of the invention.

FIG. 12 shows an example, non-limiting implementation of the present invention in a base station. The base station receives at a lower rate over a slower channel base station selections from mobile terminals (block 180). A decision is made whether connections to various mobile terminals need to be handed over to other base stations. If so, such handover operations may be performed. The base station also receives sector, antenna, and maximum data rate information from plural mobile terminals (block 182). Preferably, one or more of the mobile terminals transmits plural rate requests, sector selections, and antenna selections. For each mobile terminal sector, antenna, and rate selection, the base station selects a requested sector and antenna to transmit data packets to the mobile terminal. The selected sector varies one or more transmission parameters, (e.g., modulation, coding rate, etc.), to accommodate the maximum data rate transmission to the mobile terminal (block 184). For those mobile terminals sending plural sector, antenna, and rate selections, the base station chooses an acceptable sector to transmit data packets to each of these mobile terminals to balance and increase overall down link throughput from the base station (block 186).

While the present invention has been described with respect to a particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. For example, although the description above focuses on the downlink adaptation, the present invention may be used in uplink adaptation. Therefore, while the present invention is described in relation to preferred example embodiments, it is to be understood that this disclosure is only illustrative and exemplary of the present invention. Accordingly, it is intended that the invention be limited only by the scope of the claims appended hereto.

What is claimed is:

1. In a radio communications system where mobile terminals communicate with base stations over a radio interface, each base station having plural sectors, a method comprising:

identifying a base station associated with a data transmission to the mobile terminal;

requesting a sector at the base station to transmit data to the mobile terminal;

determining information relating to a data rate associated with the requested sector;

transmitting the requested sector or the information relating to the data rate to the base station at a first rate; and transmitting an identification of the base station to the base station at a second rate lower than the first rate.

2. The method in claim 1, further comprising:

determining a signal quality of a signal received from the sector, and determining the data rate based on the signal quality, wherein the information relating to the data rate is the determined data rate.

3. The method in claim 2, wherein the data rate is a peak or maximum data rate.

4. The method in claim 1, wherein both the requested sector and the data rate information are transmitted to the base station at the first rate.

5. The method in claim 1, wherein each sector includes first and second antennas, the method further comprising:

determining a first antenna data rate associated with the first antenna in the first sector;

determining a second antenna data rate associated with the second antenna in the first sector;

requesting one of the sector antennas; and transmitting an identification of the requested sector and an identification of the requested one of the first and second sector antennas to the base station at the first rate.

6. The method in claim 5, further comprising:

determining a first signal quality of a signal received from the first sector antenna and a second signal quality of a signal received from the second sector antenna;

determining the first antenna data rate based on the first signal quality; and determining the second antenna data rate based on the second signal quality.

7. The method in claim 1, further comprising:

identifying a first sector and a second sector at the selected base station as candidates for transmitting data to the mobile terminal;

determining a first sector data rate associated with the first sector;

determining a second sector data rate associated with the second sector; and transmitting the first sector data rate and the second sector data rate to the base station at the first rate.

8. The method in claim 1, further comprising:

assigning a subchannel to each of the candidate sectors;

transmitting the first sector data rate on its assigned subchannel; and transmitting the second sector data rate on its assigned subchannel.

9. The method in claim 8, wherein the subchannels are code multiplexed.

10. The method in claim 8, wherein the subchannels are time multiplexed.

11. The method in claim 8, wherein the subchannels correspond to orthogonal codes.

12. In a radio communications system having a base station with plural sectors and a mobile terminal communicating over a radio interface, a method implemented in the mobile terminal comprising sending information relating to a data transmission rate for packet data to be transmitted to the mobile terminal over the radio interface and a sector identification to the base station on a fast channel, and sending an identification of the base station on a slower channel.

13. In a radio communications system where mobile terminals communicate with base stations over a radio interface, each base station having plural sectors, a method comprising:

receiving first information from a mobile terminal at a first rate including a base station identification identifying a base station selected by the mobile terminal to transmit data to the mobile terminal;

receiving second information from the mobile terminal at a second rate higher than the first rate including at least one of a sector identification identifying a sector requested by the mobile terminal to transmit data to the mobile terminal and data associated with a transmission rate at which to transmit that data; and if the base station is identified, transmitting data to the mobile terminal based on the received second information.

14. The method in claim 13, wherein the second information includes both the sector identification and the data associated with the transmission rate.

15. The method in claim 13, wherein the second information includes the sector identification and the base station includes a storage queue of data packets to be sent to the mobile terminal, the method further comprising:

sending the data in the storage queue from the identified sector to the mobile terminal.

16. The method in claim 13, wherein the second information includes the data transmission rate, the method further comprising:

sending the data at the data transmission rate.

17. The method in claim 16, further comprising:

adapting an amount of coding of the data to accommodate the data transmission rate.

18. The method in claim 16, further comprising:

adapting a type of data modulation to accommodate the data transmission rate.

19. The method in claim 16, wherein a number of data packets is increased or decreased per unit of time to accommodate the data transmission rate.

20. The method in claim 16, wherein a size of a data packet is increased or decreased to accommodate the data transmission rate.

21. The method in claim 13, wherein the second information includes the data associated with the transmission rate and the data is a signal quality indicator, the method further comprising:

determining a data transmission rate using the signal quality indicator, and sending the data at the data transmission rate.

22. The method in claim 13, further comprising:

receiving the second information from the mobile terminal for plural sectors, and requesting one of the plural sectors to send the data to the mobile terminal.

23. The method in claim 22, further comprising:

receiving the second information from plural mobile terminals, wherein the second information from each of the mobile terminals identifies plural sectors, and requesting one of the plural sectors for each of the mobile terminals so that data throughput to each of the plural mobile terminals is optimized.

24. The method in claim 13, wherein each sector includes plural antennas, the method further comprising:

receiving the second information from the mobile terminal for the plural antennas, and requesting one of the plural antennas to send the data to the mobile terminal.

25. The method in claim 24, further comprising:

receiving the second information from plural mobile terminals, wherein the second information from each of the mobile terminals identifies plural antennas, and requesting one of the plural sectors and one of the plural antennas for each of the mobile terminals so that data throughput to each of the plural mobile terminals is optimized.

26. The method in claim 13, wherein the second rate is high enough to track rapid changes in radio channel conditions.

27. A radio communications system comprising:

plural base stations, each of the plural base stations including plural sectors;

plural mobile terminals communicating with a base station over a radio interface, wherein a mobile terminal sends information relating to a data transmission rate for packet data to be transmitted to the mobile terminal over the radio interface and a sector identification to the base station on a fast radio channel and sends an identification of the base station on a slower radio channel, and wherein the identified base station transmits the packet data from the identified sector using the information relating to the data transmission rate.

28. The system in claim 27, wherein the information relating to the data transmission rate includes a maximum data transmission rate from the requested sector under current radio channel conditions for a particular performance level.

29. The system in claim 27, wherein the information relating to the data transmission rate includes a signal quality indicative of the radio channel condition between the requested sector and the mobile terminal.

30. The system in claim 27, wherein the identified sector adapts an amount of data coding or a type of data modulation in order to transmit the packet data at the data transmission rate.

31. In a radio communications system where mobile terminals communicate with base stations over a radio interface, each base station having plural sectors, a mobile terminal comprising:
   data processing circuitry;
   signal processing and radio transceiving circuitry coupled to the data processing circuitry,
   wherein the data processing circuitry is configured to perform the following tasks:
      identifying a base station associated with a data transmission to the mobile terminal;
      identifying a sector at the base station to transmit data to the mobile terminal; and
      determining information relating to a data rate associated with the sector, and
      the signal processing and transceiving circuitry is configured to perform the following tasks:
         transmitting one of an identification of the sector and the information relating to the data rate to the base station at a first rate, and
         transmitting an identification of the base station to the base station at a second rate lower than the first rate.

32. The mobile terminal in claim 31, further comprising:
   a signal quality detector for determining a signal quality of a signal received from the sector,
   wherein the data processing circuitry is further configured to determine the data rate based on the signal quality.

33. The mobile terminal in claim 31, further comprising:
   a signal quality detector for determining a signal quality of a signal received from the sector,
   wherein the information relating to the data rate is the determined signal quality.

34. The mobile terminal in claim 31, wherein the data rate is a peak or maximum data rate requested under current conditions.

35. The mobile terminal in claim 31, wherein both the sector identification and the first data rate are transmitted to the base station at the first rate.

36. The mobile terminal in claim 31, wherein each sector includes first and second antennas and the data processing circuitry is further configured to:
   determine a first antenna data rate associated with the first antenna in the first sector;
   determine a second antenna data rate associated with the second antenna in the first sector;
   request one of the sector antennas; and
   transmit an identification of the sector and an identification of the requested one of the first and second sector antennas to the base station at the first rate via the signal processing and transceiving circuitry.

37. The mobile terminal in claim 31, further comprising:
   a signal quality detector for determining a signal quality of a first signal quality of a signal received from the first sector antenna and a second signal quality of a signal received from the second sector antenna,
   wherein the data processing circuitry is further configured to:
      determine the first antenna data rate based on the first signal quality; and
      determine the second antenna data rate based on the second signal quality.

38. The mobile terminal in claim 31, wherein the data processing circuitry is further configured to:
   identify a first sector and a second sector at the selected base stations as candidates for transmitting data to the mobile terminal;
   determine a first sector data rate associated with the first sector; and
   determine a second sector data rate associated with the second sector,
   wherein the signal processing and transceiving circuitry is further configured to:
      transmit the first sector data rate and the second sector data rate to the base station at the first rate.

39. The mobile terminal in claim 31, wherein the data processing circuitry is further configured to assign a subchannel to each of the candidate sectors, and
   wherein the signal processing and transceiving circuitry is further configured to:
      transmit the first sector data rate on its assigned subchannel; and
      transmit the second sector data rate on its assigned subchannel.

40. In a radio communications system where mobile terminals communicate with base stations over a radio interface, base station comprising:
   data processing circuitry, and
   plural sectors, each sector including signal processing and transceiving circuitry;
   wherein the data processing circuitry is configured to perform the following tasks:
      receive first information from a mobile terminal at a first rate including a base station identification identifying a base station to transmit data to the mobile terminal, and
      receive second information from the mobile terminal at a second rate higher than the first rate including at least one of a sector identification identifying a sector to transmit data to the mobile terminal and data associated with a transmission rate at which to transmit that data; and
      wherein the data is transmitted to the mobile terminal based on the received second information.

41. The base station in claim 40, wherein the second information includes both the sector identification and the data transmission rate.

42. The base station in claim 40, wherein the second information includes the sector identification and the data processing circuitry includes a storage queue of data packets to be sent to the mobile terminal and is further configured to send the data in the storage queue from the identified sector to the mobile terminal.

43. The base station in claim 40, wherein the second information includes the data transmission rate, and the data processing circuitry is configured to send the data at the data transmission rate.

44. The base station in claim 43, wherein each sector includes a channel coder, and the data processing circuitry is configured to regulate the channel coder to accommodate the data transmission rate.

45. The base station in claim 43, wherein each sector includes a modulator, and the data processing circuitry is configured to regulate the modulator to accommodate the data transmission rate.

46. The base station in claim 40, wherein the second information includes the data associated with the transmission rate and the data is a signal quality indicator, and the data processing circuitry is configured to determine a data transmission rate using the signal quality indicator.

47. The base station in claim 40, wherein the second information is received from the mobile terminal for plural sectors, and the data processing circuitry is configured to request one of the plural sectors to send the data to the mobile terminal.

48. The base station in claim 47, wherein the second information is received from plural mobile terminals and the second information from each of the mobile terminals identifies plural sectors, and wherein the data processing circuitry is configured to request one of the plural sectors for each of the mobile terminals to improve data throughout.

49. The base station in claim 40, wherein each sector includes plural antennas and the second information received from the mobile terminal is for the plural antennas, and wherein the data processing circuitry is configured to request one of the plural antennas to send the data to the mobile terminal.

50. The base station in claim 49, wherein the second information is received from plural mobile terminals and the second information from each of the mobile terminals identifies plural antennas, and wherein the data processing circuitry is configured to request one of the plural sectors and one of the plural antennas for each of the mobile terminals to improve data throughput.

51. The base station in claim 40, wherein the second rate is high enough to track rapid changes in radio channel conditions.

* * * * *